United States Patent
Yu et al.

(10) Patent No.: US 7,254,308 B2
(45) Date of Patent: Aug. 7, 2007

(54) LIGHT GUIDE PLATE AND BACKLIGHT MODULE USING THE SAME

(75) Inventors: Tai-Cherng Yu, TU-Cheng (TW); Charles Leu, Fremont, CA (US); Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 64 days.

(21) Appl. No.: 11/181,634

(22) Filed: Jul. 14, 2005

(65) Prior Publication Data
US 2006/0018623 A1    Jan. 26, 2006

(30) Foreign Application Priority Data
Jul. 23, 2004    (TW) ............... 93122047 A

(51) Int. Cl.
*G02B 6/10* (2006.01)
(52) U.S. Cl. ...................... 385/146; 362/615
(58) Field of Classification Search ............. None
See application file for complete search history.

(56) References Cited

U.S. PATENT DOCUMENTS

| | | | |
|---|---|---|---|
| 6,582,095 B1 | 6/2003 | Toyoda | |
| 2001/0053075 A1* | 12/2001 | Parker et al. | 362/31 |
| 2002/0163790 A1* | 11/2002 | Yamashita et al. | 362/31 |
| 2003/0137824 A1* | 7/2003 | Shinohara et al. | 362/31 |
| 2003/0156328 A1* | 8/2003 | Goto et al. | 359/599 |
| 2003/0169584 A1* | 9/2003 | Miyashita | 362/31 |
| 2004/0012944 A1* | 1/2004 | Suzuki et al. | 362/31 |
| 2004/0245218 A1* | 12/2004 | Chen | 216/96 |
| 2005/0243574 A1* | 11/2005 | Teng et al. | 362/600 |

* cited by examiner

*Primary Examiner*—Sung Pak
*Assistant Examiner*—M. Stahl
(74) *Attorney, Agent, or Firm*—Morris Manning & Martin LLP; Tim Tingkang Xia, Esq.

(57) ABSTRACT

A backlight module (2) includes a light source (66) and a light guide plate (20), the light guide plate includes a light incidence surface (25), a light-emitting surface (21) adjacent to the light incidence surface; and a bottom surface (22) opposite to the light-emitting surface, the bottom surface includes a plurality of curved grooves (23), the light-emitting surface includes a plurality of grooves (24). In the backlight module, because of the curved grooves of the bottom surface and the grooves of the light-emitting surface, light beams entering the light guide plate are concentrated at the bottom surface and light-emitting surface, thus the surface light beams outputting from the light-emitting surface have a rather higher brightness.

20 Claims, 6 Drawing Sheets

LIGHT GUIDE PLATE AND BACKLIGHT MODULE USING THE SAME

BACKGROUND

1. Field of the Invention

The present invention relates to light guide plates and backlight modules that use light guide plates, such backlight modules typically being incorporated into devices such as liquid crystal displays.

2. General Background

In a typical liquid crystal display, a backlight module provides a surface light source for illuminating the liquid crystal display. Generally, the backlight module includes a light guide plate and a light source arranged adjacent to one side of the light guide plate. The light guide plate changes light beams received from the light source into surface light beams, and directs the surface light beams to a liquid crystal panel of the liquid crystal display.

FIG. 13 shows a conventional backlight module 1. The backlight module 1 comprises a light guide plate 10 and a point light source 13 adjacent to a corner of the light guide plate 10. The light guide plate 10 includes a bottom surface 11. The bottom surface 11 has a plurality of curving grooves 12. Each of the curving grooves 12 is bounded by a pair of ridges, and each of the ridges is continuous along a length thereof. Generally the curving grooves 12 are concentric relative to the point light source 13.

In operation, light beams emitted from the point light source 13 propagate within the light guide plate 10 toward the curving grooves 12 in directions perpendicular to the curving grooves 12. The light beams are reflected and refracted at the curving grooves 12, and are then output from a light-emitting region (not shown) of the light guide plate 10. With this configuration, the light beams output from the light-emitting region provide improved brightness and uniformity of illumination.

However, there is ongoing demand for backlight modules to provide even more improved brightness and uniformity of illumination. A new light guide plate for a backlight module which can meet this demand is desired.

SUMMARY

A light guide plate according to one embodiment of the invention comprises a light source and a light guide plate. The light guide plate includes a light incidence surface, a light-emitting surface adjacent to the light incidence surface; and a bottom surface opposite to the light-emitting surface. The bottom surface includes a plurality of curved grooves, and the light-emitting surface includes a plurality of grooves.

The backlight module has the following advantages. In one embodiment of the invention, light beams from the light source pass through the light incidence surface and enter the light guide plate, reflect and refract in the light guide plate, and finally the surface light beams output from the light-emitting surface. When the light beams reach the bottom surface of the light guide plate, the curved grooves on the bottom surface concentrate the light beams and enhance brightness of the light beams. Then the light beams reach the light-emitting surface, and are further concentrated by the grooves on the light-emitting surface again, thus surface light beams outputting from the light-emitting surface have a relatively high brightness.

Other advantages and novel features will become more apparent from the following detailed description when taken in conjunction with the accompanying drawings, in which:

DETAILED DESCRIPTION OF THE PREFERRED EMBODIMENTS

Figure 1:
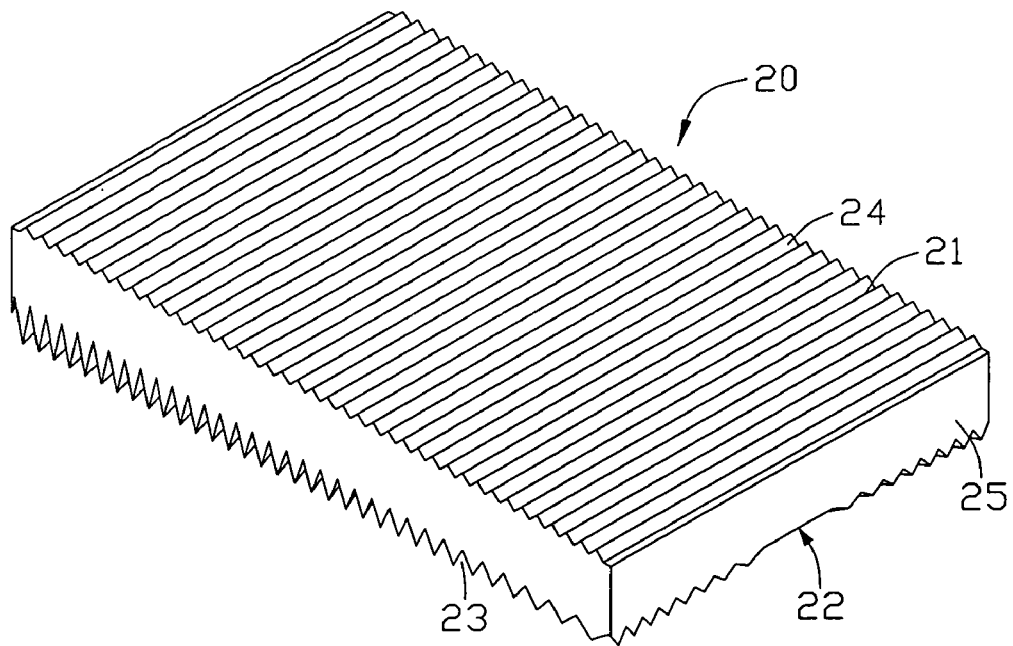
FIG. 1 is a schematic, isometric view of a light guide plate according to a first embodiment of the present invention.
Figure 2:
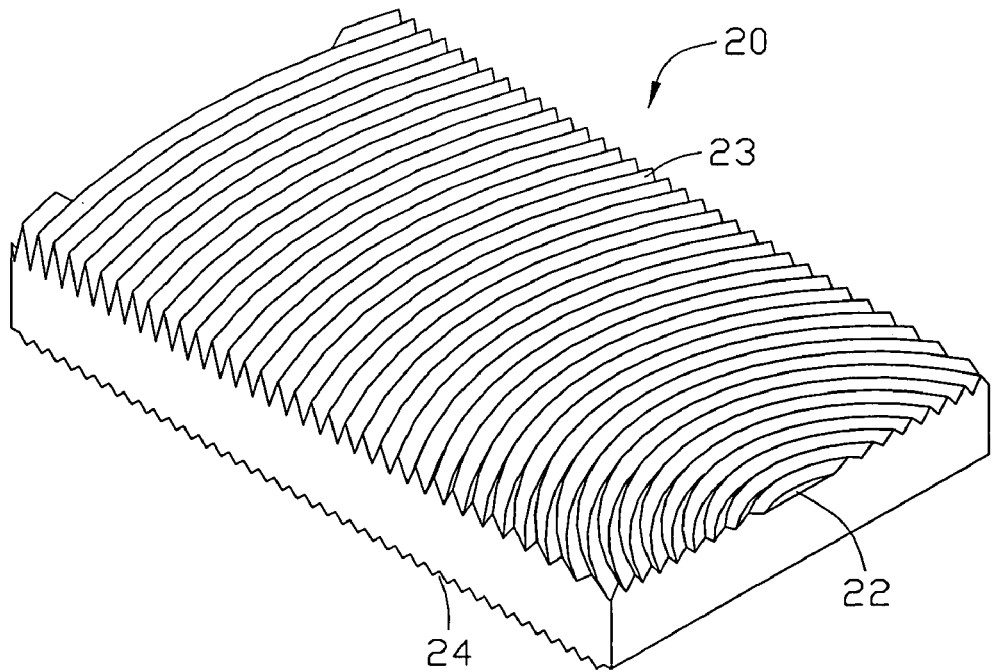
FIG. 2 is an inverted, isometric view of the light guide plate of FIG. 1.
Figure 3:
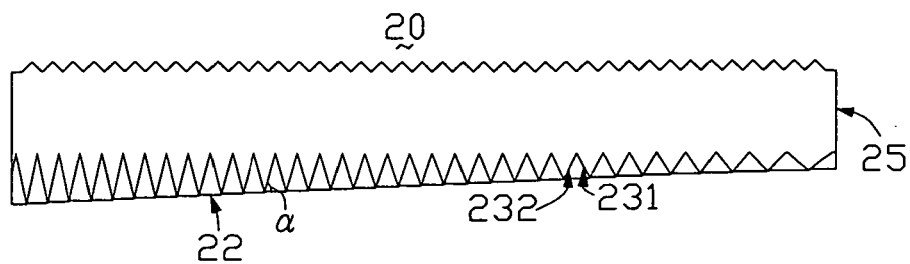
FIG. 3 is a side plan view of the light guide plate shown in FIG. 1.
Figure 4:
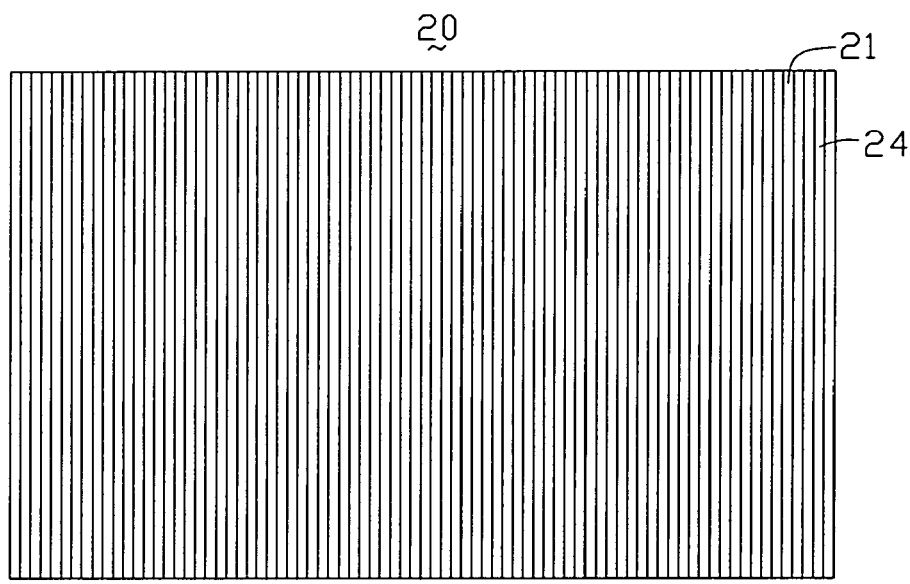
FIG. 4 is a schematic, top plan view of the light guide plate of FIG. 1, showing a light-emitting surface thereof.
Figure 5:
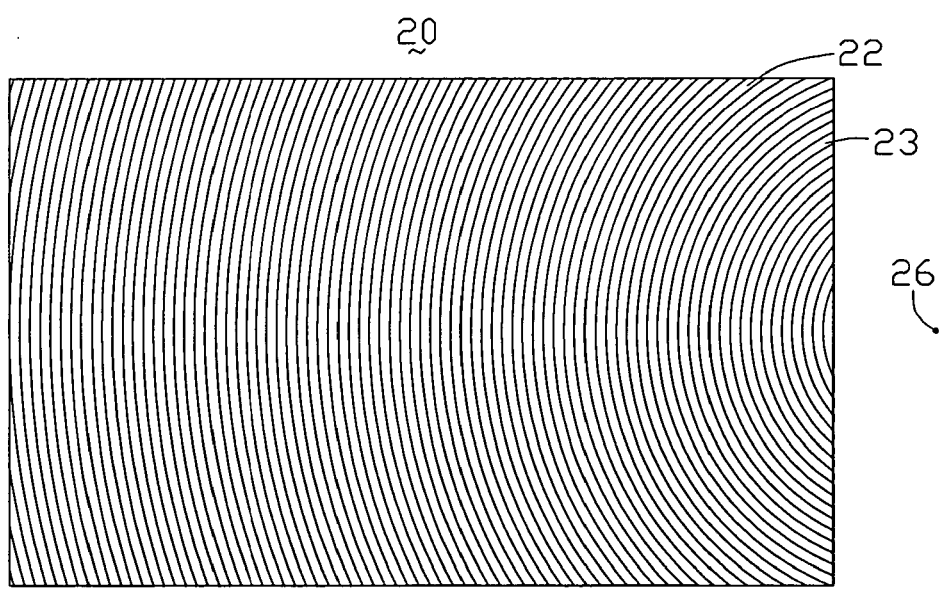
FIG. 5 is a schematic, bottom plan view of the light guide plate of FIG. 1, showing a bottom surface thereof.

Referring to FIG. 1 through FIG. 5, a plate-like light guide member 20 according to the first embodiment of the invention includes a light incidence surface 25, a light-emitting surface 21 adjacent to the light incidence surface 25, and a bottom surface 22 opposite to the light-emitting surface 21. A plurality of parallel, circular arc grooves 23 are defined at the bottom surface 22. The circular arc grooves 23 have widths in a range from $10^{-6}$ meters to $10^{-8}$ meters. Each of the circular arc grooves 23 is bounded by two parallel ridges of the light guide plate 20. Each of the ridges has a similar shape, and is continuous along a length thereof. An overall shape of each circular arc groove 23 is part of a corresponding imaginary circle. The circular arc grooves 23 are generally concentric relative to a reference point 26, which is located outside the light guide plate 20 opposite to a middle of the light incidence surface 25. The light guide plate 20 having the circular arc grooves 23 may be simultaneously formed as a single body. A cross-sectional type view of each circular arc groove 23 defines a V-shape, which includes two sides 231 and 232 of two corresponding ridges of the light guide plate 20. The side 232 generally faces toward the light incidence surface 25. An angle α is defined between the side 232 and the bottom surface 22. The angle α of successive sides 232 of the light guide plate 20 progressively increases with increasing distance away from the light incidence surface 25. The light-emitting surface 21 has a plurality of linear V-cuts 24 defined thereat. The V-cuts 24 are parallel to one another.

Figure 6:
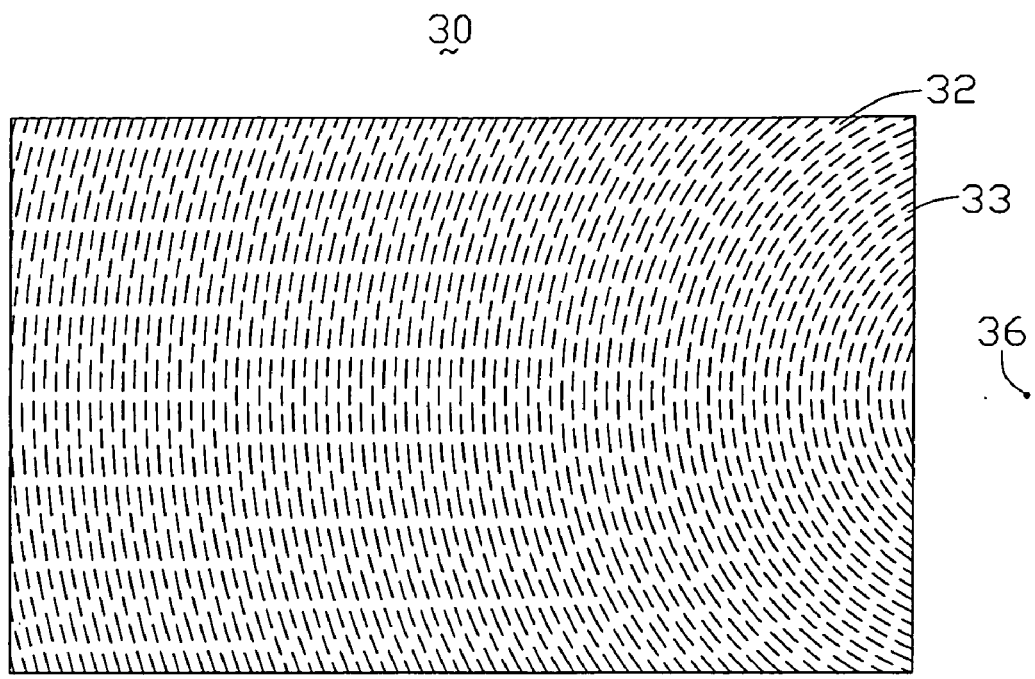
FIG. 6 is a schematic, plan view of a bottom surface of a light guide plate according to a second embodiment of the present invention.

Referring to FIG. 6, a light guide plate 30 according to the second embodiment of the invention is shown. The light guide plate 30 includes a light incidence surface (not visible), a light-emitting surface (not visible) adjacent to the light incidence surface, and a bottom surface 32 opposite to the light-emitting surface. A plurality of circular arc grooves 33 are defined at the bottom surface 32, and a plurality of V-cuts (not visible) are defined at the light incidence surface. An overall shape of each circular arc groove 33 is part of a corresponding imaginary circle. Each of the circular arc grooves 33 is bounded by two parallel ridges of the light guide plate 20. Each of the ridges has a uniform shape, but is discontinuous to form a plurality of discontinuous units along a length thereof. The circular arc grooves 33 generally are concentric relative to a reference point 36, which is located outside the light guide plate 30 opposite to a middle of the light incidence surface. Discontinuous ridges that are adjacent each other across an intervening circular arc groove 33 may be arranged directly opposite each other, or may be arranged in staggered fashion opposite each other. In the illustrated embodiment, discontinuous ridges near the reference point 36 are mostly arranged in staggered fashion opposite each other, and discontinuous ridges distal from the reference point 36 are mostly arranged directly opposite each other.

Figure 7:
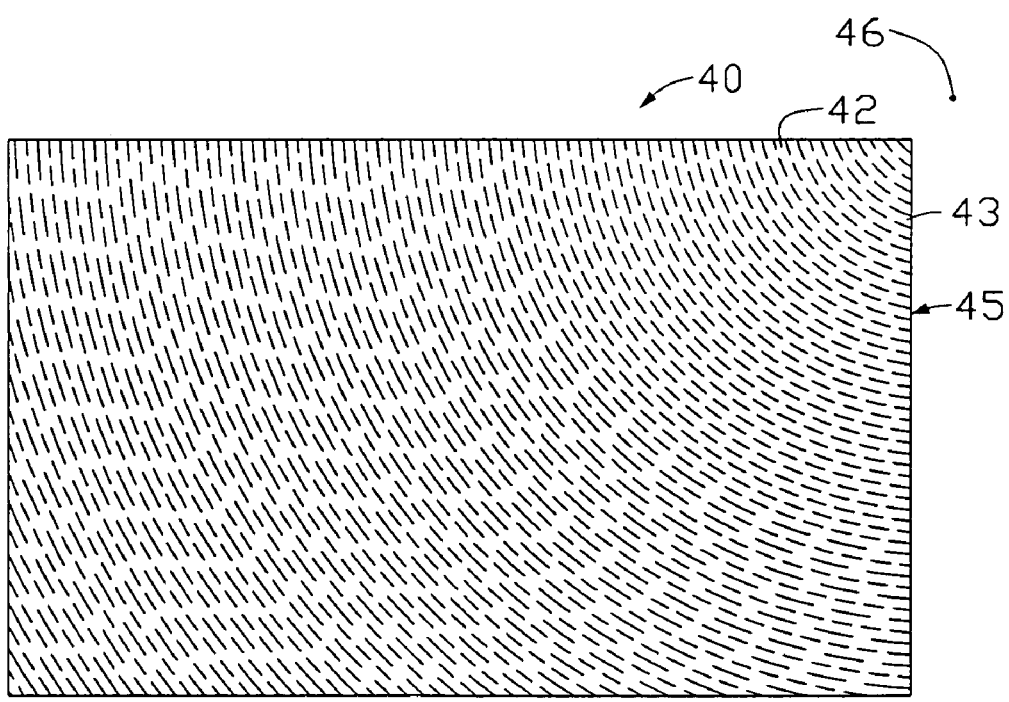
FIG. 7 is a schematic, plan view of a bottom surface of a light guide plate according to a third embodiment of the present invention.

As shown in FIG. 7, a light guide plate 40 according to the third embodiment of the invention is similar in principle to the light guide plate 30. The light guide plate 40 includes a light incidence surface 45, a bottom surface 42, and a plurality of circular arc grooves 43 at the bottom surface 42. A reference point 46 of the circular arc grooves 43 is disposed outside a corner of the light incidence surface 45.

Figure 8:
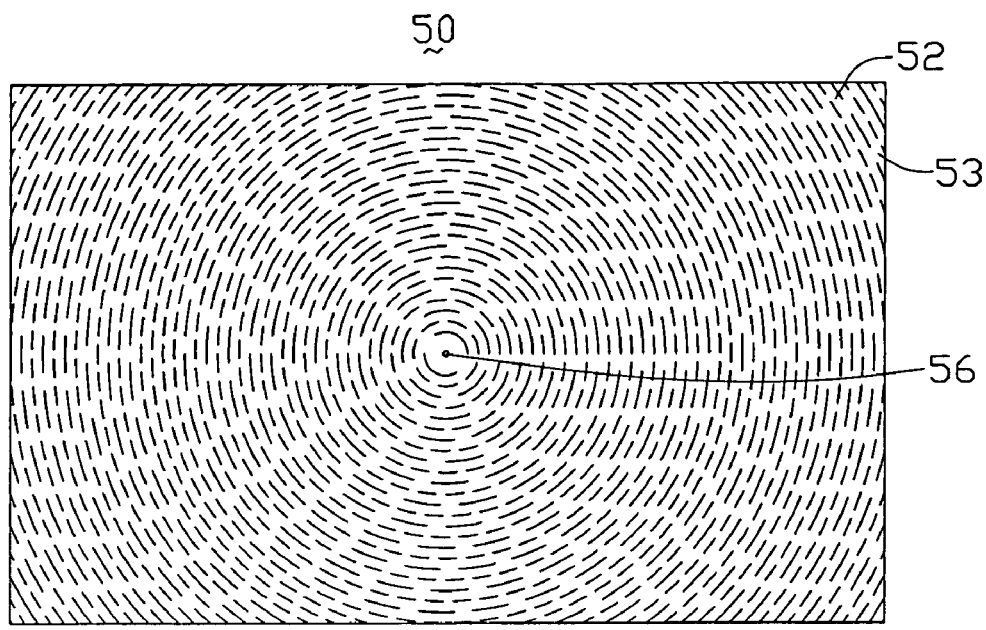
FIG. 8 is a schematic, plan view of a bottom surface of a light guide plate according to a fourth embodiment of the present invention.

As shown in FIG. 8, a light guide plate 50 according to the fourth embodiment of the invention is somewhat similar in principle to the light guide plate 30. The light guide plate 50 includes a bottom surface 52, and a plurality of concentric circular arc grooves 53 at the bottom surface 52. A center 56 of the circular arc grooves 53 is at a center of the bottom surface 52.

Figure 9:
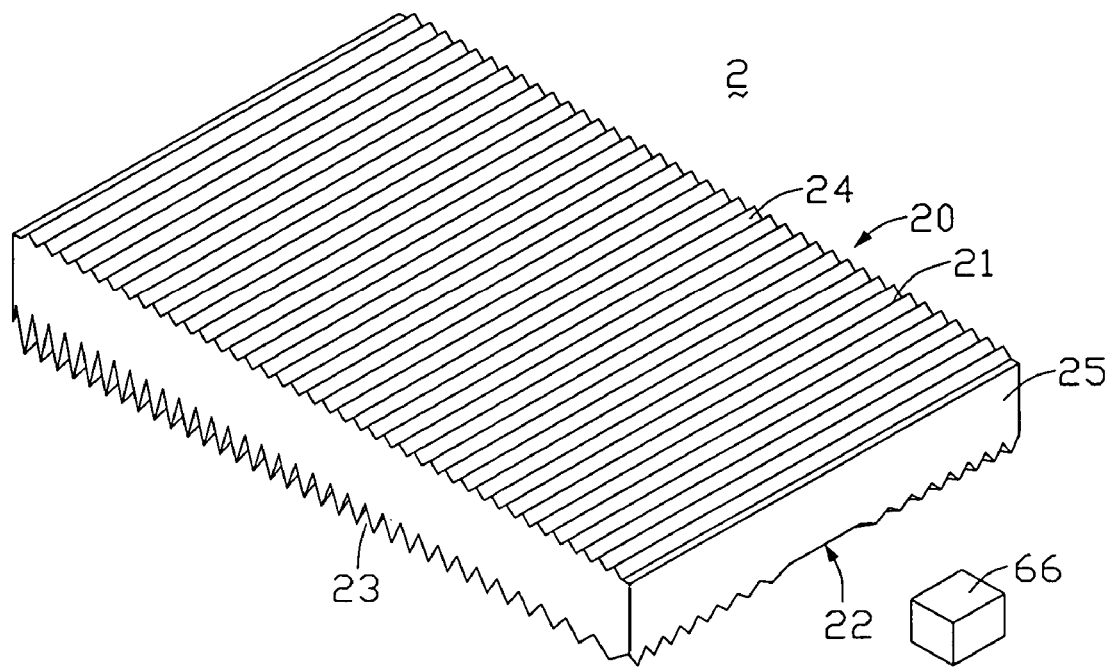
FIG. 9 is a schematic, isometric view of a first embodiment of a backlight module according to the present invention, the backlight module comprising the light guide plate of FIG. 1.

FIG. 9 shows a first embodiment of a backlight module of a display device according to the present invention. The backlight module 2 includes the light guide plate 20, and a light source 66 opposite to a middle of the light incidence surface 25 of the light guide plate 20. That is, the light source 66 locates at the reference point 26 of the circular arc grooves 23 of the bottom surface 22 of the light guide plate 20. The light source 66 is, for example, a light emitting diode.

When the backlight module 2 operates, light beams from the light source 66 pass through the light incidence surface 21 and enter the light guide plate 20. The light beams are reflected and refracted in the light guide plate 20, and finally surface light beams are output from the light-emitting surface 21. When light beams within the light guide plate 20 reach the bottom surface 22, the circular arc grooves 23 of the bottom surface 22 concentrate the light beams and enhance their brightness. In addition, when light beams reach the light-emitting surface 21, they are concentrated by the V-cuts 24. Thus the surface light beams output from the light-emitting surface 21 have a relatively high brightness.

Figure 10:
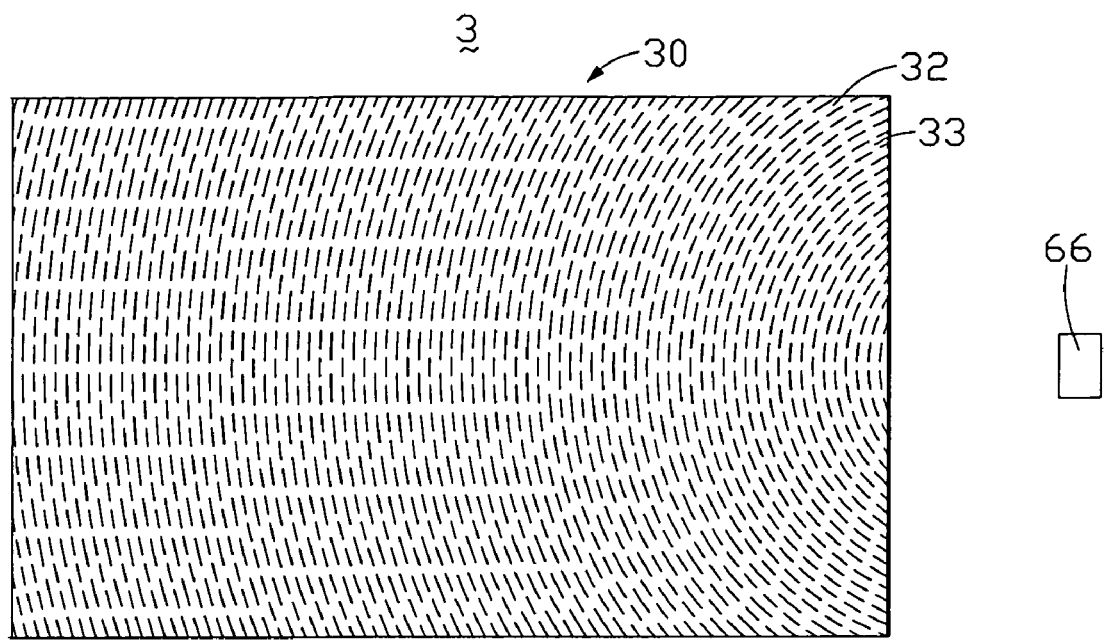
FIG. 10 is a schematic, bottom plan view of a second embodiment of a backlight module according to the present invention, the backlight module comprising the light guide plate of FIG. 6.

FIG. 10 shows a second embodiment of a backlight module according to the present invention. The backlight module 3 includes the light guide plate 30 and a light source 66. The light source 66 is arranged opposite to a middle of the light incidence surface 35. In the backlight module 3, the ridges bounding the circular arc grooves 33 are discontinuous, and many discontinuous ridges that are adjacent each other across an intervening circular arc groove 33 are arranged in staggered fashion opposite each other. Therefore the circular arc grooves 33 can refract light beams within the light guide plate 30 in good quantity, and output light beams having improved uniformity can be obtained.

Figure 11:
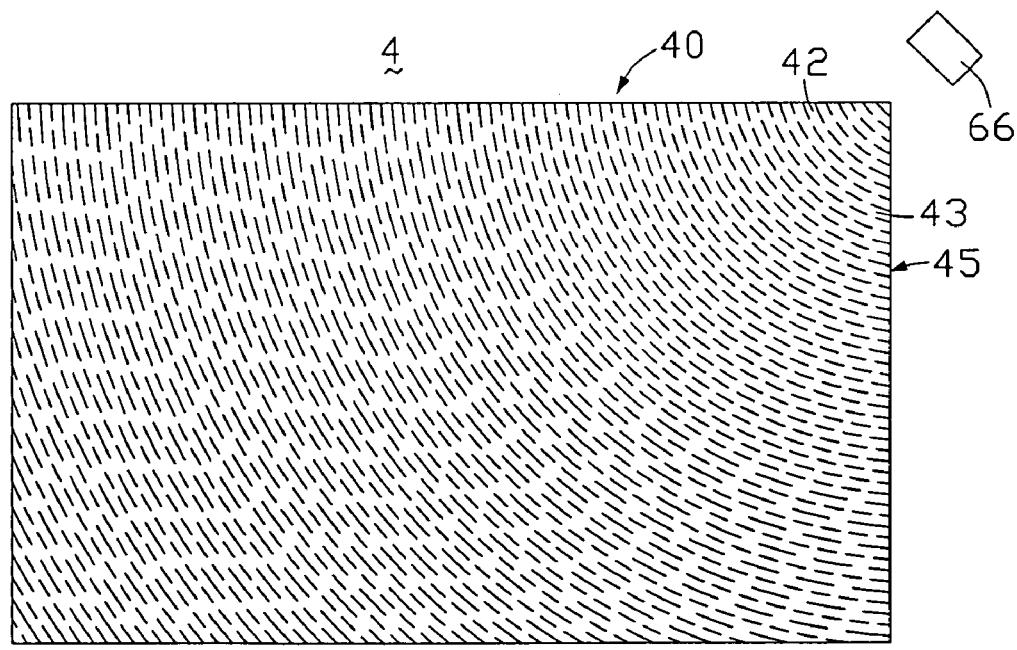
FIG. 11 is a schematic, bottom plan view of a third embodiment of a backlight module according to the present invention, the backlight module comprising the light guide plate of FIG. 7.

FIG. 11 shows a third embodiment of a backlight module of a display device according to the present invention. The backlight module 4 includes the light guide plate 40 and a light source 66. The light source 66 is disposed outside a corner of the light incidence surface 45. In particular, the light source 66 is disposed at the reference point 46 of the circular arc grooves 43.

Figure 12:
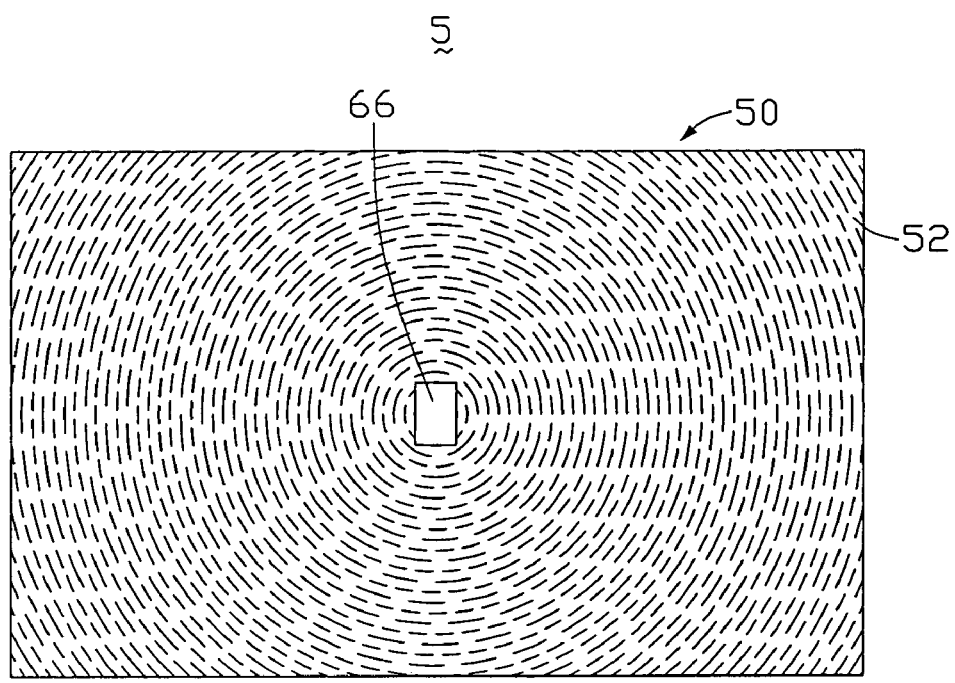
FIG. 12 is a schematic, bottom plan view of a fourth embodiment of a backlight module according to the present invention, the backlight module comprising the light guide plate of FIG. 8.
Figure 13:
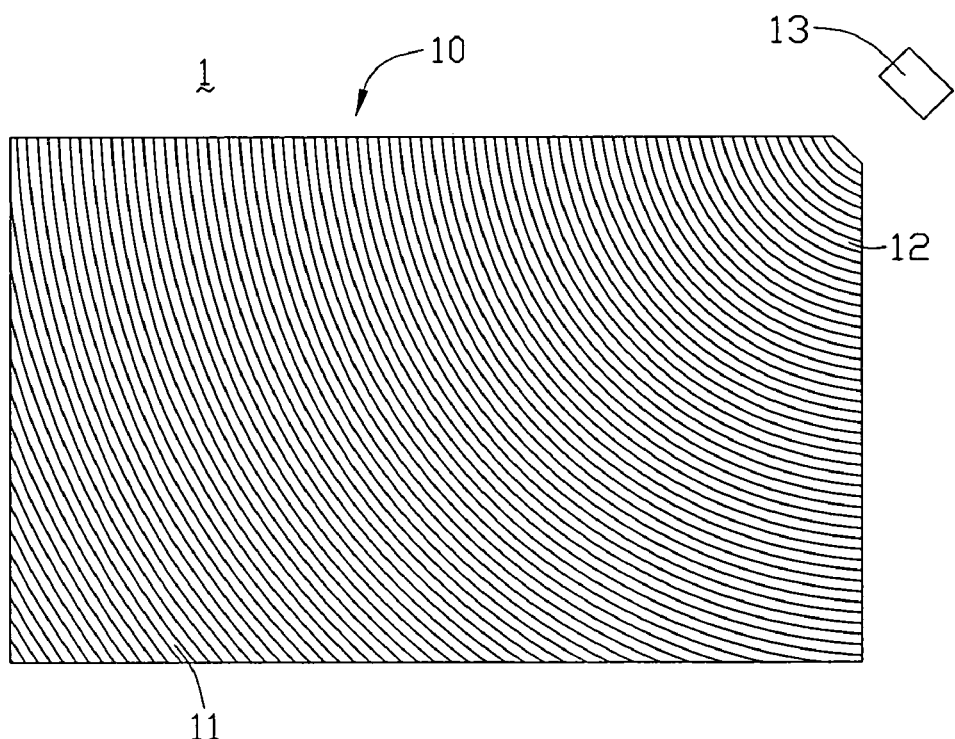
FIG. 13 is a schematic, bottom plan view of a conventional backlight module.

FIG. 12 shows a fourth embodiment of a backlight module according to the present invention. The backlight module 5 includes the light guide plate 50 and a light source 66. The light source 66 is disposed at the center of the bottom surface 52.

In summary, the backlight module 2 taken as an exemplary embodiment has the following advantages. Light beams from the light source 66 pass through the light incidence surface 25 and enter the light guide plate 20, and are reflected and refracted within the light guide plate 20. Finally, surface light beams are output from the light-emitting surface 21. When the light beams reach the bottom surface 22 of the light guide plate 20, the circular arc grooves 23 at the bottom surface 22 concentrate the light beams and enhance a brightness of the light beams. These brighter light beams reach the light-emitting surface 21, and are further concentrated by the V-cuts 24 of the light-emitting surface 21. Thus surface light beams output from the light-emitting surface 21 have high brightness.

Furthermore, the inventive light guide plate and backlight module are not limited to the embodiments described above. For example, grooves at the bottom surface and at the light-emitting surface of the light guide plate may define a cross-section that is generally trapezoidal, trapezium-shaped, arcuate, arch-shaped, and so on. The angle or angles defined by the grooves and the bottom surface may be configured according to the brightness and other characteristics of the light source used.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:
1. A light guide plate comprising:
   a light incidence surface;
   a light-emitting surface adjacent to the light incident surface and having a plurality of grooves; and
   a bottom surface opposite to the light-emitting surface and having a plurality of curved grooves, wherein the curved grooves have widths in the range from $10^{-6}$ meters to $10^{-8}$ meters.

2. The light guide plate according to claim 1, wherein the curved grooves of the bottom surface are circular arc grooves.

3. The light guide plate according to claim 2, wherein the circular arc grooves are concentric relative to a single reference point.

4. The light guide plate according to claim 1, wherein each curved groove is bounded by a pair of ridges along a length thereof.

5. The light guide plate according to claim 4, wherein the ridges are discontinuous.

6. The light guide plate according to claim 1, wherein one or more of the curved grooves defines a V-shaped cross-section.

7. The light guide plate according to claim 6, wherein each of a plurality of the V-shaped grooves is bounded by a side generally facing toward the light incidence surface, an angle α is defined between each of such sides and the bottom surface, and the angle α of successive such sides progressively increases with increasing distance away from the light incidence surface.

8. The light guide plate according to claim 1, wherein the grooves of the light-emitting surface define one or more cross-sectional shapes that are selected from the group consisting of V-shapes, generally trapezoidal, trapezium-shaped, arcuate, and arch-shaped.

9. A backlight module comprising a light guide plate and a light source, the light guide plate comprising:
   a light incidence surface configured for receiving light beams emitted from the light source;
   a light-emitting surface adjacent to the light incidence surface and having a plurality of grooves; and
   a bottom surface opposite to the light-emitting surface and having a plurality of curved grooves, wherein the curved grooves have widths in the range from $10^{-6}$ meters to $10^{-8}$ meters.

10. The backlight module according to claim 9, wherein the curved grooves of the bottom surface are circular arc grooves.

11. The backlight module according to claim 10, wherein the circular arc grooves are concentric relative to a single reference point, and the light source is located at the reference point.

12. The backlight module according to claim 9, wherein each curved groove is bounded by a pair of ridges along a length thereof.

13. The backlight module according to claim 12, wherein the ridges are continuous.

14. The backlight module according to claim 9, wherein one or more of the curved grooves defines a V-shaped cross-section.

15. The backlight module according to claim 14, wherein each of a plurality of the V-shaped grooves is bounded by a side generally facing toward the light incidence surface, an angle α is defined between each of such sides and the bottom surface, and the angle α of successive such sides progressively increases with increasing distance away from the light incidence surface.

16. The backlight module according to claim 9, wherein the grooves of the light-emitting surface define one or more cross-sectional shapes that are selected from the group consisting of V-shapes, generally trapezoidal, trapeziform-shaped, arcuate, and arch-shaped.

17. A display device comprising:
   a light source to emit light;
   a light guide member comprising an incidence surface for accepting said light from said light source and a light-emitting surface for transmitting said light out of said light guide member for further use in said display device, said light guide member comprising a plurality of curved grooves interferingly located in paths of said light transmitted through said light guide member, each of said plurality of curved grooves extending orthogonally to said light paths and being substantially surrounded by two neighboring ridges, and said plurality of curved grooves having widths in the range from $10^{-6}$ meters to $10^{-8}$ meters.

18. The display device according to claim 17, wherein each of said two neighboring ridges comprises discontinuous units arranged along an extending length of said each of said two neighboring ridges, and said discontinuous units of one of said two neighboring ridges are staggered from said discontinuous units of the other of said two neighboring ridges along said light paths.

19. The light guide plate according to claim 4, wherein the ridges are continuous.

20. The backlight module according to claim 12, wherein the ridges are discontinuous.

* * * * *